US008731007B2

(12) United States Patent
Bar-Sade et al.

(10) Patent No.: US 8,731,007 B2
(45) Date of Patent: May 20, 2014

(54) DIGITAL MICROWAVE RADIO LINK WITH A VARIETY OF PORTS

(75) Inventors: Idan Bar-Sade, Sunnyvale, CA (US);
Eliezer Pasternak, Palo Alto, CA (US);
John Park, San Jose, CA (US); Bin Zhang, Fremont, CA (US)

(73) Assignee: Remec Broadband Wireless, LLC, San Diego, CA (US)

( * ) Notice: Subject to any disclaimer, the term of this patent is extended or adjusted under 35 U.S.C. 154(b) by 0 days.

(21) Appl. No.: 12/684,756

(22) Filed: Jan. 8, 2010

(65) Prior Publication Data

US 2011/0081872 A1 Apr. 7, 2011

Related U.S. Application Data

(63) Continuation of application No. 11/322,972, filed on Dec. 30, 2005.

(51) Int. Cl.
*H04J 3/02* (2006.01)

(52) U.S. Cl.
USPC .......................................................... 370/538

(58) Field of Classification Search
USPC ........................................ 370/538, 539, 540
See application file for complete search history.

(56) References Cited

U.S. PATENT DOCUMENTS

| 4,123,716 A | 10/1978 | Borg |
| 4,186,344 A | 1/1980 | Higuchi et al. |
| 4,232,318 A | 11/1980 | Becker et al. |
| 4,520,474 A | 5/1985 | Vilmur |
| 4,847,873 A | 7/1989 | Kuwaoka et al. |
| 4,868,516 A | 9/1989 | Henderson et al. |
| 5,010,405 A | 4/1991 | Schreiber et al. |
| 5,036,299 A | 7/1991 | Dick et al. |
| 5,241,566 A | 8/1993 | Jackson |
| 5,274,449 A | 12/1993 | Keesen |
| 5,325,401 A | 6/1994 | Halik et al. |
| 5,349,644 A * | 9/1994 | Massey et al. .................. 706/10 |
| 5,387,939 A | 2/1995 | Naimpally |
| 5,436,930 A | 7/1995 | Bremer et al. |
| 5,440,585 A | 8/1995 | Partridge, III |
| 5,446,762 A | 8/1995 | Ohba et al. |
| 5,448,555 A | 9/1995 | Bremer et al. |

(Continued)

FOREIGN PATENT DOCUMENTS

| EP | 1 303 067 | 4/2004 |
| WO | WO 96/24225 | 8/1996 |
| WO | WO 99/62225 | 12/1999 |

OTHER PUBLICATIONS

PCT/US2010/061929 International Search Report on Patentability mailed Apr. 25, 2011.

(Continued)

*Primary Examiner* — Mark Rinehart
*Assistant Examiner* — Mohammad Anwar
(74) *Attorney, Agent, or Firm* — DLA Piper LLP (US)

(57) ABSTRACT

A microwave radio terminal capable of multiple gigabits/sec bit rate is provided. The radio terminal may use QAM modulation, including the two lowest modulation formats of BPSK and QPSK. The serial bit stream, including forward error correction (FEC) and all other overhead, is prepared in a digital circuit, such as a filed programmable gate array (FPGA) and is output serially, using SERDES devices inside the FPGA, as two separate channels known as "I-channel" and "Q-channel".

13 Claims, 12 Drawing Sheets

(56) References Cited

U.S. PATENT DOCUMENTS

| | | | |
|---|---|---|---|
| 5,463,660 A | 10/1995 | Fukasawa et al. | |
| 5,526,172 A | 6/1996 | Kanack | |
| 5,537,436 A | 7/1996 | Bottoms et al. | |
| 5,537,441 A | 7/1996 | Bremer et al. | |
| 5,608,263 A | 3/1997 | Drayton et al. | |
| 5,789,988 A | 8/1998 | Sasaki | |
| 5,821,836 A | 10/1998 | Katehi et al. | |
| 5,844,944 A | 12/1998 | Betts et al. | |
| 5,859,877 A | 1/1999 | Betts et al. | |
| 5,881,047 A | 3/1999 | Bremer et al. | |
| 5,907,560 A | 5/1999 | Spruyt | |
| 5,956,373 A | 9/1999 | Goldston et al. | |
| 5,959,516 A | 9/1999 | Chang et al. | |
| 6,005,894 A | 12/1999 | Kumar | |
| 6,018,644 A | 1/2000 | Minarik | |
| 6,028,885 A | 2/2000 | Minarik et al. | |
| 6,028,933 A | 2/2000 | Heer et al. | |
| 6,034,990 A | 3/2000 | Kang | |
| 6,094,102 A | 7/2000 | Chang et al. | |
| 6,127,908 A | 10/2000 | Bozler et al. | |
| 6,150,901 A | 11/2000 | Auken | |
| 6,151,354 A | 11/2000 | Abbey | |
| 6,157,679 A | 12/2000 | Johnson | |
| 6,172,378 B1 | 1/2001 | Hull et al. | |
| 6,215,789 B1* | 4/2001 | Keenan et al. | 370/399 |
| 6,232,847 B1 | 5/2001 | Marcy et al. | |
| 6,265,948 B1 | 7/2001 | Stevenson | |
| 6,282,248 B1 | 8/2001 | Farrow et al. | |
| 6,330,236 B1 | 12/2001 | Ofek et al. | |
| 6,359,938 B1 | 3/2002 | Keevill et al. | |
| 6,483,814 B1* | 11/2002 | Hsu et al. | 370/277 |
| 6,496,519 B1* | 12/2002 | Russell et al. | 370/465 |
| 6,539,031 B1 | 3/2003 | Ngoc et al. | |
| 6,567,473 B1 | 5/2003 | Tzannes | |
| 6,741,643 B1 | 5/2004 | McGibney | |
| 6,798,784 B2 | 9/2004 | Dove et al. | |
| 6,853,261 B1 | 2/2005 | Ling | |
| 6,879,663 B2 | 4/2005 | Fox | |
| 6,907,048 B1 | 6/2005 | Treadaway et al. | |
| 6,925,113 B2* | 8/2005 | Kim et al. | 375/227 |
| 6,937,456 B2 | 8/2005 | Pasternak | |
| 6,937,666 B2 | 8/2005 | Pasternak | |
| 6,973,141 B1* | 12/2005 | Isaksen et al. | 375/308 |
| 7,002,941 B1 | 2/2006 | Treadaway et al. | |
| 7,010,728 B2 | 3/2006 | Adam et al. | |
| 7,010,738 B2* | 3/2006 | Morioka et al. | 714/752 |
| 7,055,039 B2 | 5/2006 | Chavanne et al. | |
| 7,065,326 B2 | 6/2006 | Lovberg et al. | |
| 7,103,279 B1* | 9/2006 | Koh et al. | 398/115 |
| 7,133,423 B1 | 11/2006 | Chow et al. | |
| 7,142,564 B1* | 11/2006 | Parruck et al. | 370/474 |
| 7,184,466 B1 | 2/2007 | Seemann et al. | |
| 7,200,336 B2 | 4/2007 | Yu et al. | |
| 7,205,911 B2 | 4/2007 | Kim et al. | |
| 7,245,633 B1 | 7/2007 | Mueller | |
| 7,280,609 B2* | 10/2007 | Dottling et al. | 375/295 |
| 7,324,600 B2 | 1/2008 | Pauli et al. | |
| 7,359,407 B1 | 4/2008 | Mattos et al. | |
| 7,392,092 B2 | 6/2008 | Li et al. | |
| 7,392,279 B1 | 6/2008 | Chandran et al. | |
| 7,424,058 B1 | 9/2008 | Staley et al. | |
| 7,457,947 B2 | 11/2008 | Carr | |
| 7,529,215 B2 | 5/2009 | Osterling | |
| 7,564,908 B2 | 7/2009 | Luz et al. | |
| 7,627,023 B1* | 12/2009 | Lo | 375/222 |
| 7,688,806 B2 | 3/2010 | Shore et al. | |
| 7,715,419 B2 | 5/2010 | Tatar et al. | |
| 7,752,430 B2 | 7/2010 | Dzung | |
| 7,930,543 B2 | 4/2011 | Corndorf | |
| 8,041,233 B2* | 10/2011 | Hueda et al. | 398/208 |
| 2002/0015206 A1 | 2/2002 | Hakimi et al. | |
| 2002/0021720 A1 | 2/2002 | Seto et al. | |
| 2002/0044651 A1 | 4/2002 | Tuvell | |
| 2002/0046276 A1 | 4/2002 | Coffey et al. | |
| 2002/0067755 A1 | 6/2002 | Perkins | |
| 2002/0111158 A1* | 8/2002 | Tee | 455/421 |
| 2002/0122503 A1 | 9/2002 | Agazzi | |
| 2002/0129379 A1 | 9/2002 | Levinson et al. | |
| 2002/0164951 A1 | 11/2002 | Slaughter et al. | |
| 2002/0176139 A1 | 11/2002 | Slaughter et al. | |
| 2002/0193067 A1 | 12/2002 | Cowley et al. | |
| 2003/0035430 A1* | 2/2003 | Islam et al. | 370/401 |
| 2003/0076787 A1 | 4/2003 | Katz et al. | |
| 2003/0081700 A1 | 5/2003 | Birru | |
| 2003/0110509 A1 | 6/2003 | Levinson et al. | |
| 2003/0154495 A1 | 8/2003 | Sage | |
| 2003/0179771 A1 | 9/2003 | Chan et al. | |
| 2004/0028164 A1 | 2/2004 | Jiang et al. | |
| 2004/0033079 A1* | 2/2004 | Sheth et al. | 398/135 |
| 2004/0120418 A1 | 6/2004 | Pasternak | |
| 2004/0127158 A1 | 7/2004 | Dai et al. | |
| 2004/0136711 A1 | 7/2004 | Finan et al. | |
| 2004/0208243 A1 | 10/2004 | Feher | |
| 2005/0075078 A1 | 4/2005 | Makinen et al. | |
| 2005/0088991 A1 | 4/2005 | Kil | |
| 2005/0196119 A1 | 9/2005 | Popovic et al. | |
| 2006/0050870 A1 | 3/2006 | Kimmel et al. | |
| 2006/0056620 A1 | 3/2006 | Shingal et al. | |
| 2006/0084406 A1 | 4/2006 | Strachan et al. | |
| 2006/0171714 A1* | 8/2006 | Dove | 398/71 |
| 2006/0264210 A1 | 11/2006 | Lovberg et al. | |
| 2007/0014395 A1 | 1/2007 | Joshi et al. | |
| 2007/0153726 A1 | 7/2007 | Bar-Sade et al. | |
| 2007/0160168 A1 | 7/2007 | Beukema et al. | |
| 2010/0034385 A1 | 2/2010 | Gantman | |
| 2011/0013911 A1 | 1/2011 | Alexander et al. | |

OTHER PUBLICATIONS

PCT/US2010/061929 Written Opinion mailed Apr. 25, 2011.

International Preliminary Report on Patentability dated Nov. 9, 2010 in corresponding Application No. PCT/US2006/046856.

International Search Report dated Nov. 28, 2008 in corresponding Application No. PCT/US2006/046856.

Written Opinion dated Nov. 28, 2008 in corresponding Application No. PCT/US2006/046856.

S. Bryant, G. Swallow, L. Martini, D. McPherson; Pseudowire Emulation Edge to Edge Control Word for Use over an MPLS PSN; RFC 4385; Feb. 2006.

William Stallings; Gigabit Ethernet; The Internet Protocol Journal—vol. 2, No. 3; Sep. 1999.

PCT International Search Report of PCT/US08/08491; dated Oct. 6, 2008.

PCT Written Opinion of PCT/US08/08491; dated Oct. 6, 2008.

Housley & Corry, "GigaBeam Radio Link Encryption", Oct. 2006, 14 pages.

Federal Information Processing Standards Publication 197, Advanced Encryption Standard (AES):, Nov. 26, 2001, 47 pages.

Federal Information Processing Standards Publication 140-2, Security Requirements for Cryptographic Modules:, May 25, 2001, 61 pages.

Morris, Dworkin, "Recommendation for Block Cipher Modes of Operation, Methods and Techniques, Computer Security", National Institute of Standard and Technology (NIST) Special Publication 800-38A, 2001 Edition, Dec. 2001, 59 Pages.

10/100/1000Mbps Ethernet MAC with protocol Acceleration, MAC-NET Core with Avalon Interface, Product Brief, Version 1.0—Feb. 2004.

Schreiber et al. "A Compatible High-Definition Television System Using the Noise-Margin Method of Hiding Enhancement Information"; dated Dec. 1989.

Muldavine et al. "30 GHz Tuned MEMS Switches"; dated Jun. 1999.

Feng et al. "Design and Modeling of RF MEMS Tunable Capacitors Using Electro-thermal Actuators"; dated Jun. 1999.

(56) References Cited

OTHER PUBLICATIONS

Kim et al. "Millimeter-wave Micromachined Tunable Filters"; dated Jun. 1999.
Nguyen et al. "Micromachined Devices for Wireless Communications"; dated Aug. 1998.
Yao et al. "High Tuning-Ration MEMS-Based Tunable Capacitors for RF Communications Applications"; dated Jun. 8, 1998.
IEEE Standard for Information technology—Telecommunications and information exchange between systems—Local and metropolitan area networks—Specific requirements; dated Jun. 12, 2007.
Biryukov "Block Ciphers and Stream Ciphers: The State of the Art"; dated Aug. 27, 2012.
Extended European Search Report of EP 10842749.3; dated Oct. 21, 2013.

* cited by examiner

DIGITAL MICROWAVE RADIO LINK WITH A VARIETY OF PORTS

PRIORITY CLAIMS/RELATED APPLICATIONS

This application claims priority under 35 USC 120 and is a continuation in part of U.S. patent application Ser. No. 11/322,972 filed on Dec. 30, 2005 and entitled "DIGITAL MICROWAVE RADIO LINK WITH ADAPTIVE DATA RATE", the entirety of which is incorporated herein by reference.

FIELD

This disclosure relates generally to the fields of microwave digital radio transmission and modulation, digital multiplexing, digital modems and Ethernet Switching.

BACKGROUND

Microwave radio links in point to point applications require increasing bit rates, some exceeding 1 gigabits per second. While the applicants have disclosed a microwave link with an adaptive rate of modulation is a commonly owned patent application (co-pending U.S. patent application Ser. No. 11/322,972 filed on Dec. 30, 2005 which is incorporated herein by reference), other improvements are desired to meet new application requirements and improve link performance and ease of operation and maintenance. Link performance in terms of rain-fade margins and bandwidth utilization can be increased by using linear modulation such as BPSK and QPSK. At the high bit rates involved, such modulation poses challenges in terms of fast carrier recovery and more flexible rate adaptation with minimum interruption to service. Some applications also require transmitting, in the same link, a variety of traffic, including Ethernet, synchronous Ethernet and legacy high speed data in the form of Sonet/SDH.

Communications service providers who wish to carry legacy PDH services (e.g. T1/E1) over Ethernet sometimes require synchronous Ethernet (SyncE) for carrying the PDH traffic using adaptors. While this technique, known as "pseudo-circuit" is available over conventional Ethernet, some service providers prefer SyncE, in which the Ethernet bit rate clock is synchronized with the PDH bit rate, all of which are synchronized to a network's primary clock. The radio link must accommodate such traffic while providing efficient service to the other types of traffic, including SDH that might operate from a different primary clock. A bandwidth-efficient multiplexing scheme is needed to accommodate these varied streams of traffic, each with different synchronization methods.

The introduction of BPSK/QPSK modulation at high speeds requires implementation of a synchronous modem with quick and efficient carrier recovery system. The high signal bandwidth requires high intermediate frequency (IF), e.g. 4.5 GHz. A noise-robust carrier recovery circuit should support conflicting requirements and have low control-loop bandwidth to maintain high signal to noise ratio (SNR), yet acquire synchronization quickly after brief events of signal fading. When carrier recovery is implemented using a phase locked loop (PLL), the narrow band design cannot lock in at the high slew rate of frequency expected after re-appearance of signal. While this problem exists in many synchronization systems, it is exacerbated when a 4.5 GHz local oscillator attempts to lock on to approximately 450 KHz bandwidth—roughly a 10,000:1 ratio. Thus, special synchronization techniques are needed to handle this limitation of current systems.

These high performance microwave links are subject to deep rain-fading conditions and also to negative link margins during the antenna alignment process. It is desired to devise a low speed digital link between the two radios operating in-band while the deep fade exists. This link may be as slow as 1 kbps, for control and telemetry purpose, and it is called "Local Channel". It is further desired to accomplish such local channel without a noticeable change in the link's normally radiated spectrum while transmitting the high speed data. This local channel should operate even when the received main signals are so low that radio is unable to synchronize on the incoming high speed carrier phase nor on the modulated symbols clock rate. Finally, this link should be constructed without significant added cost to the existing high-speed link.

Having an improved link with a mixed set of payload streams creates the desire to improve on the link's bit rate adaptation techniques when the link is undergoing a rain fade which is slightly exceeding the link's full speed margin. It is desirable to device the adaptive techniques in a manner that will minimize the down time for higher priority data streams and to increase the number of speed-degradation steps with minimum penalty to system cost or complexity.

Thus, it is desirable to provide a digital microwave system with a variety of ports that addresses the above limitations and it is to this end that the disclosure is directed.

DETAILED DESCRIPTION OF ONE OR MORE EMBODIMENTS

Figure 1:
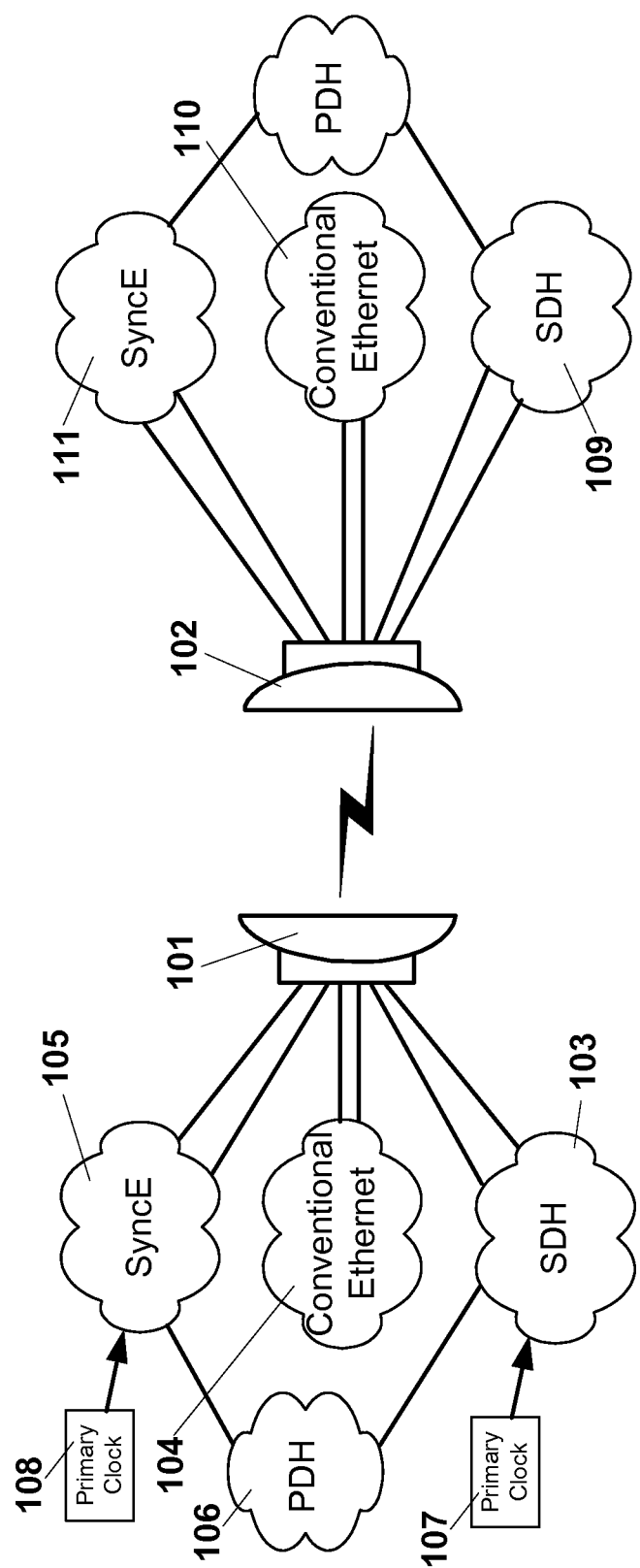
FIG. 1 shows a typical networking environment in which a microwave radio wireless link is operating.

The disclosure is particularly applicable to a digital data, microwave link with radio terminals as illustrated and described below and it is in this context that the disclosure will be described. It will be appreciated, however, that the system may be embodied as a single radio terminal or multiple radio terminals and may be implemented using other known components that are all within the scope of the disclosure.

A microwave terminal capable of multiple gigabits/sec bit rate is designed using QAM modulation, including the two lowest modulation formats BPSK and QPSK. The serial bit stream, including forward error correction (FEC) and all other overhead, is prepared in a digital circuit such as a filed programmable gate array (FPGA), and is output serially, using SERDES devices inside the FPGA, as two separate channels known as "I-channel" and "Q-channel". External analog circuits format each channel separately to the desired bandwidth using low pass filters corresponding approximately to the appropriate root-raised-cosine filter for a particular symbol rate. A plurality of such filters is constructed in parallel, each corresponding to another symbol rate and a switch selects one filter based on the current link's symbol rate setting. In addition to the ability to switch to a lower speed, hence lower a bandwidth, the link can omit one channel, say the Q channel, to gain approximately 3 dB in power margin by effectively down grading from QPSK to BPSK. The Q-channel is loaded with data of lower priority, thus it can be dropped instantly without affecting the flow of higher priority data.

A multiplexer and a framer, implemented primarily inside the FPGA, create a payload frame including all the various user traffic and payload-indication overhead. An Ethernet switch aggregates multiple Ethernet lines and delivers the lines' traffic, intended for wireless transmission, to the FPGA. This switch is capable of handling synchronous Ethernet lines and either synchronize or supply a reference clock, synchronous with the network timing source, usually extractable by the switch from the bit rate of a SyncE port. The radio terminal synchronizes the wireless bit-rate clock with the reference from the switch. The opposite terminal then uses the recovered wireless bit rate clock to drive a clock signal into that terminal's Ethernet switch to maintain synchronization. Conventional Ethernet lines, which are transported over the air, are rate-adapted to the Ethernet synchronous clock, taking advantage of the clock rate flexibility to small clock rate variations allowance in conventional Ethernet standard. Since Synchronous Digital Hierarchy (SDH) signals are also carried by the link, and those are also synchronous, but not necessarily to the same primary clock, each SDH signal is multiplexed in the radio link using slightly excessive bandwidth sufficient to accommodate the highest possible clock variation. Each such line is independently rate-adapted for transmission over the wireless link using variable payload indicators in a multiplexing payload frame. Each SDH line clock is reconstructed independently in the receiving side of the link and delivered with a clock rate virtually identical to the transmitted side. The combined payload frame now contains bytes of plurality of SyncE lines, each rate adapted if needed by changing the number of idle bytes, conventional Ethernet lines, also rate adapted to the system's bit rate clock, but in this case regardless of the need to have that clock traced to a network's primary clock, and the SDH lines, whose bits are sampled with varying number of bytes per each payload frame, passing each line's clock transparently over the radio link.

The payload frame is organized so that the beginning bytes include the payload size information followed by the higher priority payload, such as the most preferred Ethernet line or SDH line. Lower priority payloads are deferred to the second half of the frame and are subject to intentional omission during fade. Each frame is then divided to 64-bit words and two control bits are added to each word to create a stream of words with a structure similar to 64/66-bit industry standard encoding. This structure is carried through the entire digital processing, including encryption, scrambling and FEC encoding.

The receive side includes a QAM demodulator. The carrier recovery portion of that demodulator contains a Costas Loop in which the main carrier oscillator is a 4.5 GHz voltage controlled oscillator (VCO). Given the large ratio between tuning range of approximately 1 GHz of such VCO and the narrow bandwidth of about 450 KHz, the VCO is placed within 200 KHz of frequency error before an attempt to lock in. Therefore, by monitoring the receiver's digital section FEC-frame lock, if the frame is unlocked the VCO is tuned to the best known frequency using a control circuit that tunes the VCO to a nominal frequency. This control circuit compares the VCO frequency with a crystal reference and the frequency error indication is used for modifying the VCO tuning voltage in small steps. That tuning voltage is generated by a digital base value stored in a register and a D/A converter that drives the VCO tuning voltage. The VCO fine-tuning for phase locking is obtained by superimposing a smaller amplitude analog voltage delivered from a feedback circuit which is part of the carrier recovery PLL comprised by the Costas Loop. When frame-lock is obtained, the VCO continues tracking the loop filter, but the digital base value is now fine-tuned to center the loop filter at mean value, usually zero volts. Two preferred algorithms are provided for setting the base signal and later fine tuning the VCO. One algorithm has fewer steps, but would take longer to lock after a brief loss of phase lock. The more complex algorithm memorizes upon loss of lock the last known good tuning voltage and sets a tuning base signal that would best approximate the VCO condition before loss of lock. If after a preset time-period that strategy did not regain frame synchronization, the system diverts to the crystal-reference tuning as done by the more basic algorithm.

A very low cost local channel is provided. Most components of this sub-system already exist in the terminal, being needed for other functions, thus the local channel is nearly cost free. The transmitted broadband signal serves as a "carrier" for the local channel. The local channel transmission is performed by modulating the broadband transmitter power adjustment circuit using digital control at a low speed, e.g. 1 KHz, creating a sequence of higher-lower power levels of the transmitted QPSK broadband signal. These levels can differ by 1 dB, a fraction of 1 dB or even full power vs. maximum attenuation. This operation creates effectively a high-power/low power binary modulation scheme. As opposed to amplitude modulation, the phase of the broadband signal is irrelevant, thus carrier or clock recovery of the broadband traffic is not required for proper operation of this local channel. The receive side of the broadband link has a built-in power meter for signal monitoring purpose. That signal is used also for receiving the two of power levels of the local channel from the opposite side. A few passive components for filtering and one low-speed comparator are the only additional hardware needed for establishing a two-way local channel that operates even when the broadband channel signal to noise ratio is tens of dB below threshold.

The improved radio link in accordance with this Invention can perform more advanced rate-adaptive operation in varying link conditions. In good weather the link might transmit QPSK at 2.5 Gbps. When the performance threshold is approached, the "Q" channel is dropped and a power advantage of about 3 dB is gained at the expense of nodulation reduction to BPSK/1.25 Gbps. If additional link margin is required, a reduction to QPSK/250 Mbps is taken and finally BPSK/125 Mbps. The payload framing scheme ensures higher availability to higher priority data streams.

A microwave wireless radio link (wireless link) operating in a typical networking environment is shown in FIG. 1 for illustration purposes as it should be understood that the wireless link may also be used in other applications that are within the scope of the disclosure. The wireless link may have a first radio terminal 101 that is communicating with a second radio terminal 102, exchanging bi-directional digital traffic at a typical aggregate rate exceeding 1 Gbps (gigabits per second) and at a frequency above 30 GHz. Each of the radio terminals 101, 102 may include a transmit portion and a receive portion wherein the transmit portion of a particular radio terminal transmits digital traffic to the other radio terminal and the receive portion of the particular radio terminal receives digital traffic from the other radio terminal so that bi-directional digital traffic can be exchanged between the radio terminals.

The wireless link might be required to wirelessly bridge a variety of high-speed interfaces coming from various types of equipment such as digital cellular base stations for Long-Term Evolution (LTE) or WiMAX services, possibly provided by "conventional" Ethernet ports 104 operating at 1 Gbps (GigE), central office for Internet traffic, including routers, some with SDH interfaces 103, such as STM-1 155.52 Mbps, STM-4 622.8 Mbps, or even STM-16 with 2,488.32 Mbps. Other routers and servers might use conventional Ethernet. A telecommunications service provider who uses such wireless link might also wish to transport synchronous Ethernet lines (SyncE) from various equipment, collectively depicted as a cloud 105. SyncE is identical to conventional Ethernet, except that the Ethernet symbol clock is synchronous with a reference frequency, such as a primary clock 108. It is then required that the transported Ethernet line maintains such synchronization across the wireless link to an otherwise isolated cloud 111 (e.g., a SyncE line without a reference frequency.) The SDH interfaces 103 similarly have a reference frequency, such as an SDH primary clock 107, that requires synchronization with an SDH cloud 109. The SDH primary clock 107 may not be the same as the SyncE reference 108, since different services, originating at different networks, might utilize separate primary clocks. One reason for using SyncE is to circuit-emulate legacy traffic such as T1/E1 collectively known as PDH 106 and use the rest of the Ethernet line bandwidth for packet services, such as Internet Protocol. The PDH circuit emulation over Ethernet is known as a "pseudo circuit". While pseudo circuit exists over conventional Ethernet, some service providers prefer SyncE as a more robust solution.

In accordance with the wireless link, the transport of Ethernet and SDH over the wireless link is performed differently. In particular, each SDH stream is transported as a stream that maintains bit integrity by rate-adapting each stream to a channel with slightly higher rate and recovering the original bits and their corresponding clock rate at the receiving side of the link. On the other hand, Ethernet lines are rate-adapted by insertion or deletion of idle bytes which are present in any standard Ethernet line. If at least one of these Ethernet lines is a SyncE and this line is designated by the network operator as the reference link via system configuration, that SyncE serves as the clock reference for generation of the wireless link's aggregate bit rate clock and regeneration of the original SyncE clock in the receive side of the link from that aggregate bit rate. It should be noted that all types of Ethernet interfaces maintain their nominal clock rates—only the choice of synchronization source is different with the presence of SyncE, thus there is no harm done by forcing a SyncE clock on a conventional Ethernet line.

Figure 2:
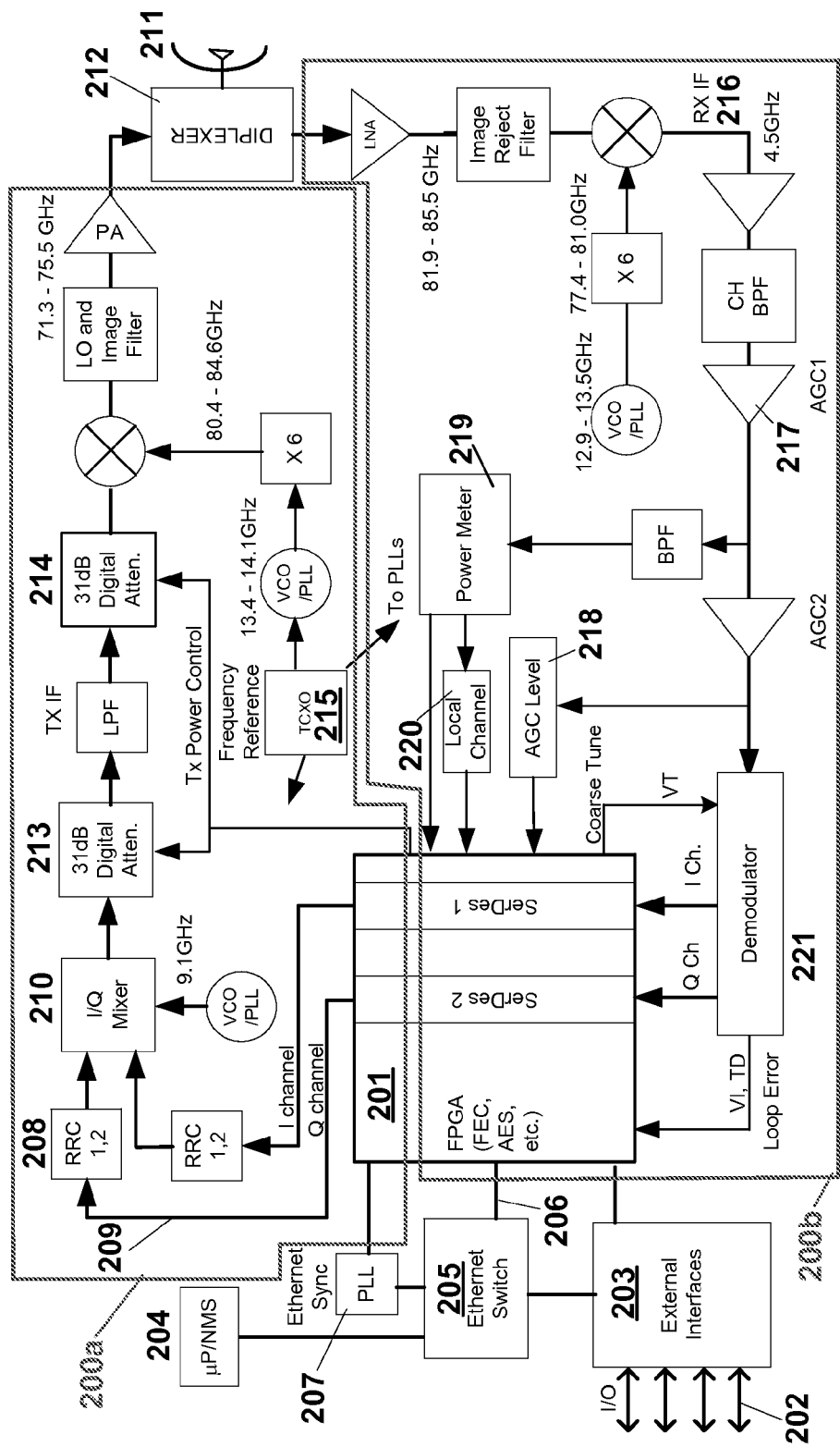
FIG. 2 is a block diagram of a radio terminal on each side of the microwave radio wireless link shown in FIG. 1.

FIG. 2 illustrates details of the electronic circuitry of the radio terminal 101, 102. The core of the digital processing in the radio terminal is performed by a digital processing unit 201 that may be implemented as a field programmable gate array (FPGA) but may also be implemented in other known manners. The radio terminal 101 or 102 also may include a transmit side/portion 200a and a receive side/portion 200b in addition to the digital processing unit 201. Many of the I/O lines and busses connected to the FPGA are omitted from the drawing for the sake of clarity, thus it should be assumed that connections exist between the FPGA and virtually any digitally controlled device of the radio terminal. The various external I/O lines 202 are connected to media conversion modules, such as fiber-to-electrical converters for fiber-optics-GigE link. An aggregate of such I/O connectors and off-the-shelf conversion modules is collectively shown as a set of external interfaces 203. The radio terminal is controlled by a processing unit 204, such as a microprocessor, with all the needed peripheral components and operating software, including a network management system (NMS). The processing unit 204 is electrically connected to various components of the radio terminals but those connections are not shown in FIG. 2 for clarity.

The electrical input data streams containing SDH traffic are connected to the digital processing unit 201 through the set of external interfaces 203, while the Ethernet streams are connected to a data segregator unit 205, such as an Ethernet Switch with synchronous Ethernet capability as shown in FIG. 2. The data segregator unit 205 segregates the Ethernet data signals from the other types of data signals. The data segregator unit transfers a plurality of Ethernet lines to the digital processing unit 201. Some of these lines 206 might correspond directly to an I/O line's 202 Ethernet traffic, while other lines may contain traffic that is aggregated and queued by the data segregator unit 205 before being sent to the digital processing unit 201 via interface lines 206. The ability of the data segregator unit to source the Ethernet clock is depicted by a PLL 207, which might also be internal to either the digital processing unit 201 or the data segregator unit 205. Alternatively, the PLL 207 might also receive clock timing from the digital processing unit 201, possibly originated from the opposite radio terminal, and output the clock to the data segregator unit 205.

The digital processing unit 201 performs all of the payload formatting and processing to be discussed below and outputs the aggregate bit streams via two serializer/deserializer (SERDES) ports, SerDes 1 and SerDes 2, that may be integrated components of a field programmable gate array (FPGA) such as Xilinx Virtex-5. Such FPGA may be also used for implementing most of the functions of the digital processing unit 201 SerDes 1 as depicted in the digital processing unit 201 outputs an "I-channel" bit stream and SerDes 2 outputs the "Q-Channel" bitstream which are known channels used in modulation techniques. Each channel bitstream might exceed 1 Gbps bit rate to allow a link bit rate in excess of 2 Gbps.

In the radio terminal, each channel bit stream is followed by a bank of switched filters. For example, the Q-channel is connected to a filter bank 208, wherein each filter corresponds to a desired link bandwidth and the filter's frequency response is designed to approximate root-raised cosine (RRC) at a symbol rate essentially equal to the Nyquist rate. The I-channel is similarly connected to a filter bank as shown. The frequency response is calculated in combination with the spectral characteristics of the nearly square wave of the I-channel symbols communicated over a link 209 from the digital processing unit 201. Since the bit rate of each I-channel bitstream or Q-channel bitstream equals the symbol rate in Quaternary phase shift keying (QPSK) modulation and binary phase shift keying (BPSK) modulation, the terms "bit rate" and symbol rates" are used interchangeably in this disclosure while referring to each I-channel and Q-channel separately when referring to QPSK or BPSK. Furthermore, while the SERDES devices 1 and 2 in the digital processor 201 output binary levels, these levels are also refereed as symbols, since the filters 209 process the signals 208 as symbols.

Each filter in the filter bank 208 may be ac-coupled, thus rather than being a low-pass filter, each filter may have a band-pass response with a low cutoff frequency below 100 kHz. If the system needs to disable a channel, such as the Q channel 209, such switching is accomplished by transmitting all zeros, or any other constant level, thus after a short transition time, no signal will be transmitted at the corresponding filter output 208 and thus there will be no radio transmission of the disabled channel. If none of the channels is disabled, each channel transmits BPSK, causing the combined signal at the I/Q mixer 210 to be QPSK. If one of the channels is disabled, such disabling causes the transmission to degrade from QPSK to BPSK modulation.

The filtered I-channel and filtered Q-channel are combined by an I/Q mixer 210, also known as a quadrature modulator, and the rest of the transmit side till the antenna 211 is a chain of up-conversion circuits ending with a diplexer 212 to implement the transmit side of a frequency division duplex (FDD) radio in the radio terminal. The transmit power can be adjusted by a set of digitally-controlled attenuators 213 and 214, providing together more than 20 dB of attenuation with steps of 1 dB or finer. All radio frequency sources in the transmit side 200a are phase-locked to one or more high precision frequency references 215, which provide 20 MHz with 0.5 ppm accuracy at a relatively low cost.

The radio terminal depicted in FIG. 2 may be, for example, a lower frequency transmit-side and thus, for example, all sources are tunable to allow a center ("carrier") transmit frequency range of 71.3-75.5 GHz. The opposite terminal transmits in a duplex frequency range, thus the sources are adjusted accordingly. The receive frequency range is approximately 10 GHz higher, as depicted. For example, this FIG. 2 terminal might transmit at 73.0 GHz and receive at 83.0 GHz. The receive side down converts the amplified-received signal to a 4.5 GHz intermediate frequency (IF) signal 216. Two automatic gain control (AGC) stages 217 are provided that allow adjustment of the signal level received from the opposite terminal to compensate for varying installation distance and link fading conditions. A combination of an AGC level monitoring 218 and a digital power meter unit 219, implemented as an integrated circuit, allow reasonable estimation of receive signal level (RSL) for reporting purpose and also for requesting of bandwidth or modulation adaptation from the opposite radio terminal. A local channel demodulator 220 (to be discussed further in conjunction with FIG. 12) recovers local channel bits if present, as discussed below. In the receive side/portion 200b, a demodulator 221 to be discussed further in conjunction with FIG. 8, recovers the transmitted I and Q bit streams from the opposite radio terminal and inputs them to the digital processing unit 201 via the input ports of SerDes 1 and SerDes 2. The received bits undergo processing inside the digital processing unit 201 to be discussed below and finally data arrives at the external interface ports 203, some of which has traveled via the data segregator unit 205 across the bus 206.

Other components in FIG. 2 include various oscillators, filters and amplifiers which are added as desired to set a particular transmit and receive frequencies, maintain desired signal levels and reject undesired spurious signals, wherein use of all of these components is familiar to art of microwave radio design.

Figure 3:
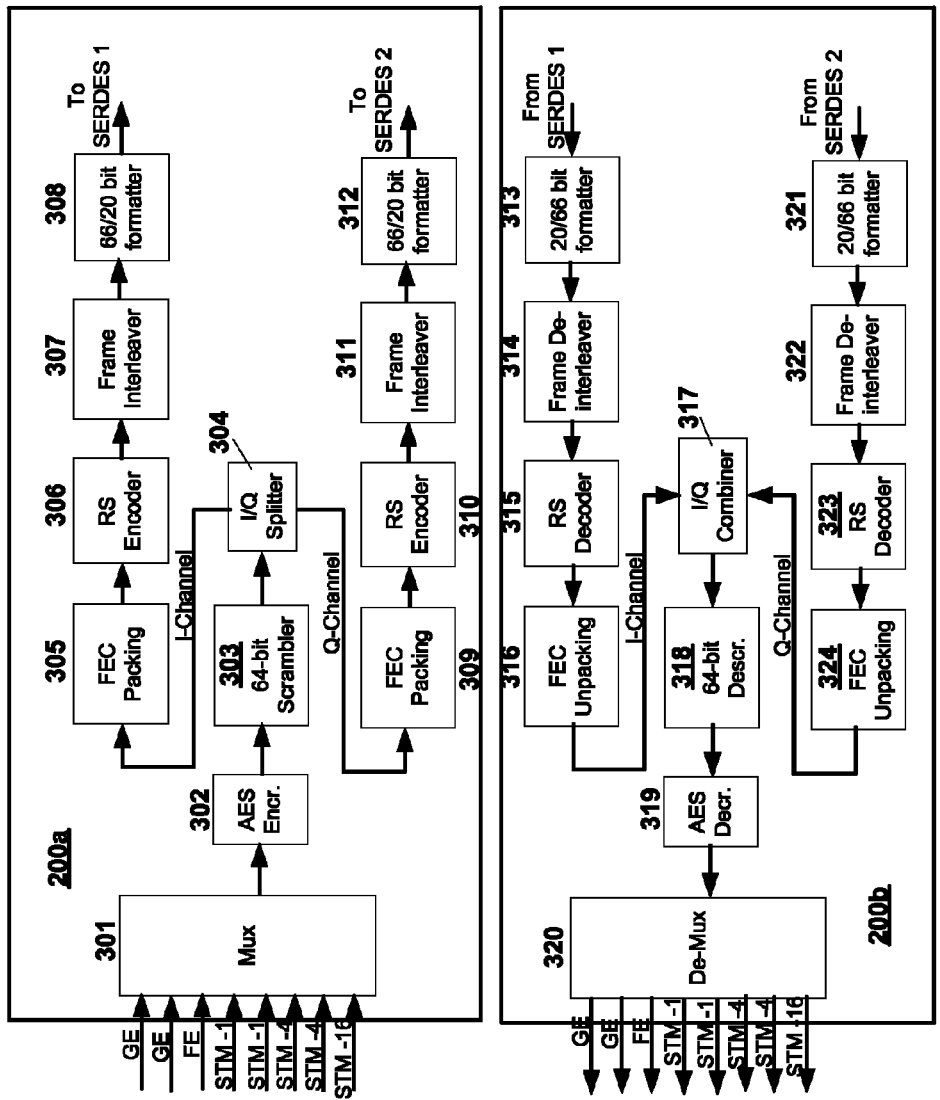
FIG. 3 is a block diagram of a set of digital processing functions of the payload information and the associated overhead of the radio terminal of FIG. 2.
Figure 4:
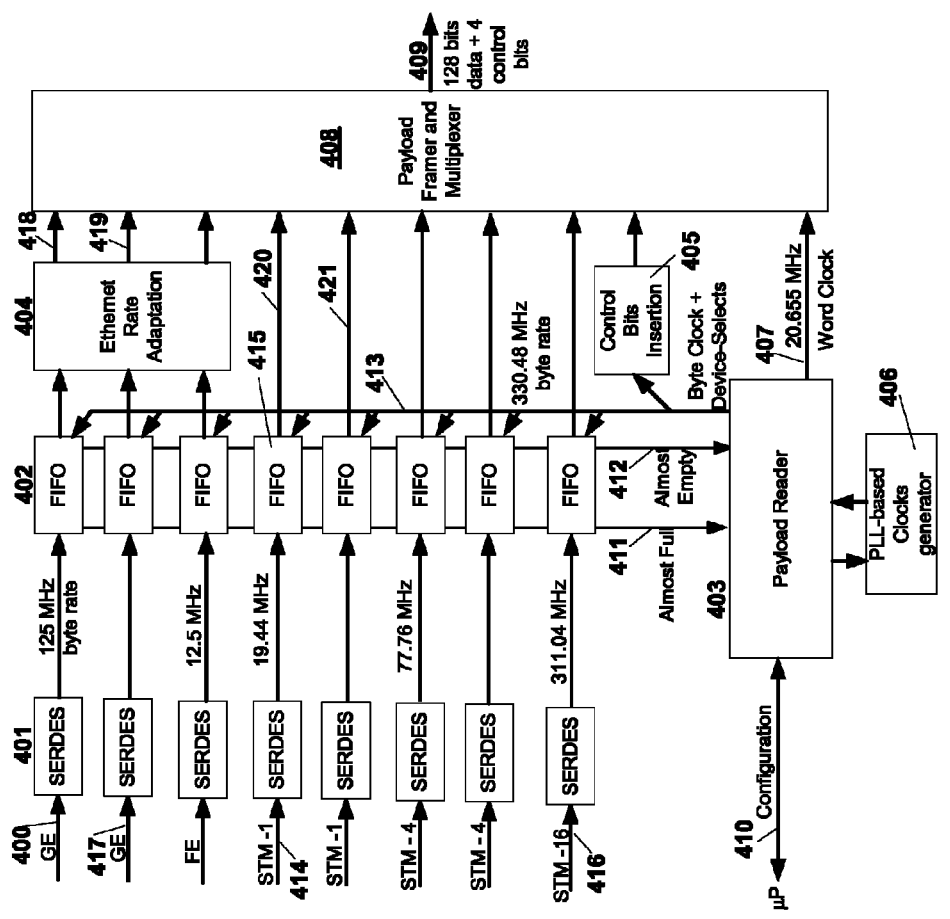
FIG. 4 is a block diagram of a set of main functions of the payload framer/multiplexer in a transmit side portion of the radio terminal of FIG. 2.
Figure 5:
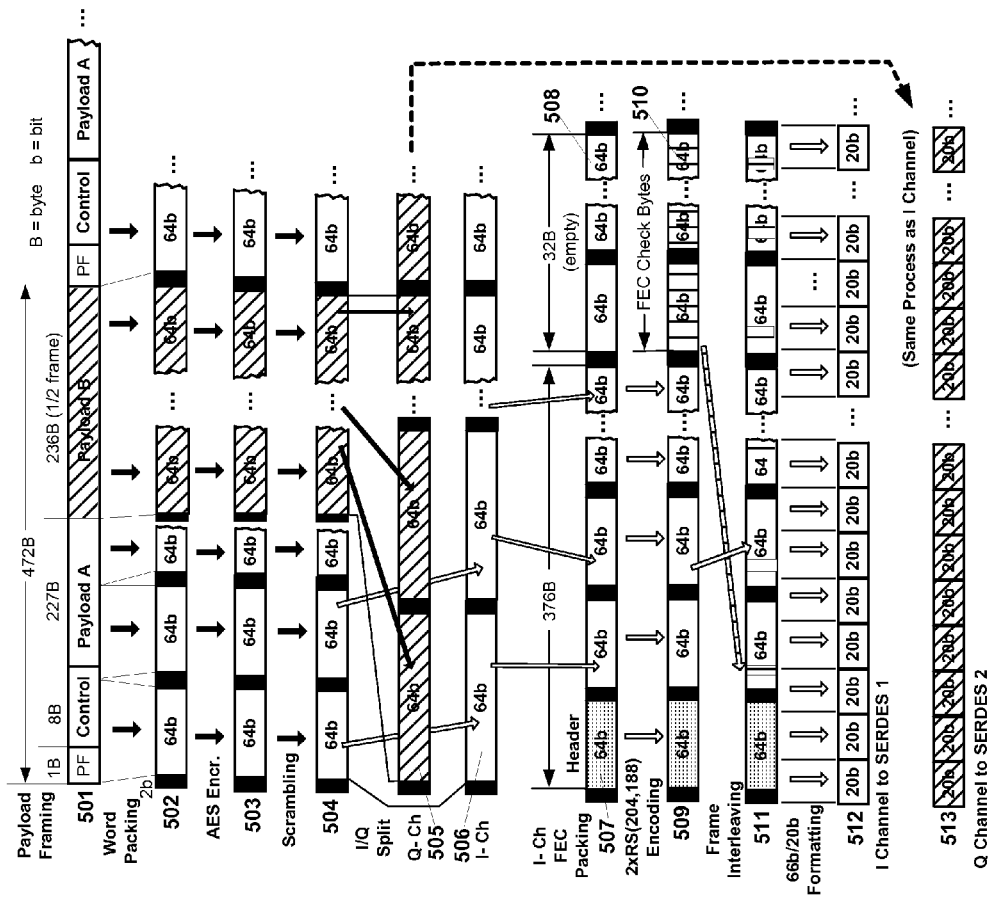
FIG. 5 depicts the digital signals formats during various processing steps of the payload and overhead in the transmit side of the radio terminal of FIG. 2.

Additional details of the digital processing and formatting of the input data streams is depicted in FIGS. 3-5. FIG. 3 shows the high-level functions performed on those input data stream bits. While the blocks in FIGS. 3 and 4 depict the processing as functional blocks, however actual design is usually performed by high-level logic programming using a language such as VHDL and automatically synthesizing the functions to be realized inside the digital processing unit 201, thus these functions or their equivalents are complied by such logic programming.

In the transmit side/portion 200b, the payload bit streams with the desired control overhead are generated by a data mapping unit 301 that may include a payload framer unit and a multiplexer as shown in FIGS. 3 and 4, from the various input data streams as discussed above and shown in FIG. 3. The aggregate bit streams are organized as 64-bit words by the data mapping unit 301 and are presented to an AES encryption block 302. The data mapping unit 301 might output "n" words in parallel to allow using multiple processing blocks such as multiple AES blocks 302 in parallel. In one embodiment, n=2 so two AES blocks 302 are implemented. Also, each word is preceded by two control bits which follow their corresponding block without processing, constituting a 64/66 bit encoding similar to the industry standard. Each word then undergoes scrambling by a scrambler unit 303 to increase random distribution of ones and zeros. The scrambled words then are split into two equal-rate streams by an I/Q splitter 304, which is a de-multiplexer that maintains each word's integrity.

The I-Channel stream then undergoes forward error correction (FEC) packing by a FEC packing unit 305 which adds overhead words for FEC framing and adds room for extra words that will later contain FEC block code overhead check sequence. The FEC framing word contains a fixed framing byte, such as 11000110, and end-to-end indication bytes, which may contain bit-fields that indicate a request for a change of bandwidth for the adaptive link operation. The formatted blocks of words now undergo FEC encoding by an Reed Solomon (RS) encoder 306 that fills the overhead words with actual check bytes. Using Reed Solomon code over a Galois field GF256, an example code size is RS(204,188). The 16 overhead bytes fit in the exact boundaries of two words. The RS encoding may be performed in parallel to allow lower-speed logic throughput. In general, "m" parallel blocks are used and, in one embodiment, the value of m=2 is used. The noticeable effect of the parallel processing is the use of word interleaving, i.e. the RS encoder 306 might output m-consecutive FEC frames with word-interleaving of the m frames, ending with a series of words containing m frame check sequences, still word interleaved. An optional further interleaving for another purpose is performed by a frame interleaver 307 that spreads FEC check bytes among the entire words of the FEC frame to reduce the chance of long streaks of no bit-level transitions. For example, an interleaving arrangement is to insert each of the 32 frame check bytes "C" between data or frame bytes "D" in the repeated pattern: [12D, 1C, 13D, 1C] . . . so that there are on average 12.5 D bytes per each C byte, creating nearly even interleaving that maps 32 overhead bytes onto the total space of 368 data+32 overhead=400 bytes in the m-frame. As C bytes are inserted, some of the remaining D bytes are pushed to the next word in sequential order. The final transmit processing process is slicing the continuous 66-bit word stream onto 22-bit slices that fits the SERDES parallel side using a 66/20 bit formatter unit 308. Such slicing is arbitrary relative to words boundaries. The serial bit stream out of the SerDes 1 forms the I-channel 209 shown in FIG. 2.

The Q-channel undergoes identical processing using an FEC packing unit 309, an RS encoder unit 310, a frame interleaver 311 and ending with 66/20 bit formatting 312. In some operating modes, e.g. BPSK, the Q channel is not used; in which case SERDES 2 is configured to output all zeros by the digital processing unit 201 shown in FIG. 2.

On the receive side 200b, the SerDes 1 or SerDes 2 20-bit slices (from the I-channel and Q-channel, respectively) are converted into 66 bit words by a 20/66 bit formatter 313, 321 that performs the inverse operation to the formatter 308, 312 as described above. The receive side 200b also has a frame de-interleaver 314, 322, an RS decoder 315, 323, an FEC unpacker 316, 324 that perform the corresponding inverse set of operations to those described above for elements 305-307 and 309-311. The I-channel and Q-channel are then fed into an I/Q combiner 317 and then a 64-bit descrambler 318 that perform the inverse operations of the scrambler 303 and I/W splitter 304 described above. These operations restore the original payload frame after an AES decryption unit 319. The resultant output data streams are demultiplexed by a demultiplexer 320 and output.

While the functionality is well defined by the transmit-side operations, some aspects deserve further attention. In particular, the 20/66 bit formatting 313, 321 must also establish correct word boundaries which is accomplished by noting the two control bits that have repeated pattern every 66 bits. For example, all of the payload words may have two control bits set to "01", except for the start of payload frame "10". Similarly, the start of FEC frame may have the control bits set to "11". Since the vast majority of control words is "01", the word pattern can be recovered by the formatter 313, 321 despite the occasional framing exceptions and any bit errors of the radio link. Another example is the FEC decoder 315, 323 processing requirements because decoding is more resource limited than encoding, thus the number of parallel FEC frames "m" discussed in the transmit side might be dictated by the decoder-side needs, rather than the encoder limitations discussed above in conjunction with the encoders 306, 310. For example, if the encoder 306, 310 can perform with m=1 and the decoder 315, 323 requires minimum m=2, both sides will use m=2.

The operations performed above require temporary buffering of data and the crossing of clock domains. That aspect is well known to digital logic designers and discussed here only briefly. Many digital processing units 201, such as FPGA devices, have built-in PLL-driven clock generators that can generate a new clock frequency which is a rational-number product of another clock rate, as needed for example in the transition from the input to the output of the FEC packing function 305, 309, to be further discussed below in conjunction with FIG. 5.

The Payload framing and multiplexing functions of the data mapping unit 301 are further detailed in FIG. 4. Each input is input to the digital processing unit 201 via a SERDES and temporarily stored in a FIFO buffer. For example, the GigE port 400 is input to the digital processing unit 201 via a SERDES 401 and temporarily stored in a FIFO 402. A timing circuit called "Payload Reader" 403 is polling each FIFO using a device select signals 413 that also communicates a byte clock. The FIFO 402 is polled at, or slightly above the nominal Ethernet rate of 125 MHz byte rate. For the Ethernet ports, an Ethernet Rate Adaptor 404 inserts the data contents of the FIFO 402 into a payload framer and multiplexer 408. However if the FIFO 402 is empty, "idle" bytes are generated by the Adaptor 404, and if the FIFO is almost full, as indicated by a FIFO-specific signal 411, the adaptor 404 would delete "idle" bytes from the Ethernet stream coming from the FIFO 402. The Ethernet Rate adaptor 404 and the entire payload frame clock 407 are synchronized with the SyncE reference from the data segregator unit (205 and 207 in FIG. 1). If SyncE operation is not required, any reference clock that meets Ethernet accuracy specifications is acceptable. In such cases in which SyncE is not used, an embodiment uses the frequency reference 215 (FIG. 1) as a reference for a clock generator 406.

An SDH line, such as the 155.52 MHz STM-1 signal 414 undergoes a similar SERDES/FIFO process as an Ethernet line, but without "idle" bytes insertion or deletion. The STM-1 FIFO 415 read clock in the clock bus 413 is synthesized at a slightly higher rate than the nominal STM-1 byte clock of 19.44 MHz. For example, the read clock 413 rate may equal 19.5 MHz, or with a little extra bandwidth penalty, even the word clock 407 at 20.655 MHz. Occasionally, the FIFO 415 will empty before the allocated number of bytes per payload frame is reached, in which case fewer bytes will be transmitted. The reduced number of bytes is indicated in the payload frame overhead as follows. After the payload field is loaded into a temporary register, control bits are inserted by the appropriate circuit 405. Each payload field has a fixed frame size of 472 bytes. The first byte is fixed frame sync byte, e.g. "11101000". The next eight bytes are "size indicators", each byte representing the number of one input's bytes loaded to the current frame. The payload bytes of the next input are then loaded. The order of inputs needs not to correspond to the order of physical inputs. Instead, the system configuration assigns priorities per each port and the ports' bytes are stored and later output by the framer 408 at decreasing level of priority. The exact middle of the frame, i.e. the end of 236 bytes, is a special reference point, since all data before that point will go to the link's I-channel and therefore will survive a QPSK to BPSK rate reduction. Towards the frame end, in the vicinity of byte 472, there may by occasionally empty bytes, either because of low aggregate input rate, or because several FIFOs were empty and the payload frame did not fill up. Such bytes are preferably filled with pseudo random values, using a pseudo-random sequence generator whose frame repetition rate is relatively prime with the payload frame repetition rate. In case of unused ports, especially if the total lines signal rates exceeds the available payload's bit rate, some or even most of the input ports are skipped. For example, if the STM-16 port 416 is in use, there is no bandwidth left for any other input's traffic, thus all other inputs are ignored.

The multiplexing system described above and shown in FIG. 4 performs two distinct functions. In particular, the Framer 408 in combination with the data segregator unit 205 in FIG. 2 perform data segregation to at least two priorities. The data segregator unit 205 sends to the data mapping unit 301 in FIG. 3 data of different priorities, for example by driving high-priority data to the port 400 and lower priority data to the port 417. The data mapping unit 301 can also contribute to said segregation by including traffic from selected lines such as STM-1 414 to the high priority or low priority payload. The framer 408 then performs data mapping of the various priority data onto designated locations in the payload frame. For example, Ethernet traffic in line 418 and STM traffic from line 420 might be mapped to payload frame fields designated as "high priority", while lines 419 and 421 are designated low priority.

In the framer 408, every group of 8-bytes is organized as a 64-bit word, preceded by two control bits, which are "10" at frame beginning and "01" elsewhere. The framer 408 outputs a continuous flow of frame-words 409 organized in two parallel words. In one embodiment, the word read order is Bytes [1-8] in parallel with bytes [237-244], then [9-16] in parallel with [245-252] etc. This order simplifies the I/Q channels separation.

The receiving-side demultiplexer 320 in FIG. 3 performs the opposite order of operations and its structure is not depicted in FIG. 4, since it is identical to the multiplexer with all data-carrying lines reversed. For received Ethernet lines, a new set of rate adaptation occurs again in the receive side to adjust the rate to the local Ethernet clock. SDH lines undergo a recovery of the transmit-side bit rate as follows. The received bits are stored in a receive-data FIFO outside the FPGA. A PLL with a voltage-controlled crystal oscillator (VCXO) regenerates the line clock by locking on the FIFO's "half full" indication. The bits are read to the external line interface unit 203 in FIG. 2 from the FIFO clocked by the PLL/VCXO.

The processing operations discussed with respect to FIGS. 3 and 4 are re-iterated in FIG. 5. For visual clarity, buffering delays are ignored. As shown in FIG. 5, a repetitive payload frame 501 is generated inside the data mapping unit 301 in FIG. 3 discussed above. The payload frame is output in the form of 64/66 words 502. The two control bits are depicted as black rectangles. The second half of the frame 501 is drawn hashed, and corresponds to the portion of the frame that would become the Q-channel. As shown in FIG. 5, each word undergoes AES encryption, resulting in encrypted words 503. Scrambling of each word follows to generate scrambled words 504. The scrambled words are split into the Q channel 505 and I-channel 506. Each channel undergoes identical operations, which are detailed in FIG. 5 for the I-channel only for clarity.

FEC packing adds and extra FEC header's 64/66 word 507 and 368 payload-bytes are appended to complete a 376-byte FEC double frame, followed by 32 empty bytes 508 which are place holders for the FEC frame check bytes. This step requires a clock rate change. For each 368 bytes of payload frame in step 506, there are now 408 FEC bloc code bytes, thus the clock rate must increase by the ratio 506/368. The clock rate change may be accomplished within the digital processing unit as discussed above. The start time of a payload frame is arbitrary relative to the FEC frame timing and the payload frame control bits are passed transparently through the FEC encoding process.

The packed frames 507 is now FEC-encoded 509 by filling the last 32 empty bytes 508 with frame check bytes 510. The next step is interleaving, in which the frame check bytes 510 are spread nearly evenly, as discussed above, throughout the data words in the double FEC frame, causing excess data words to shift to the right towards the end of the double frame. The interleaved double frame 511 is finally sliced to 20-bit sections 512 for transmission via SERDES 1 as the I-channel. The Q-channel 505 goes through the same steps, ending also with a stream of 20-bit slices 513 to be output serially by SERDES 2.

Figure 6:
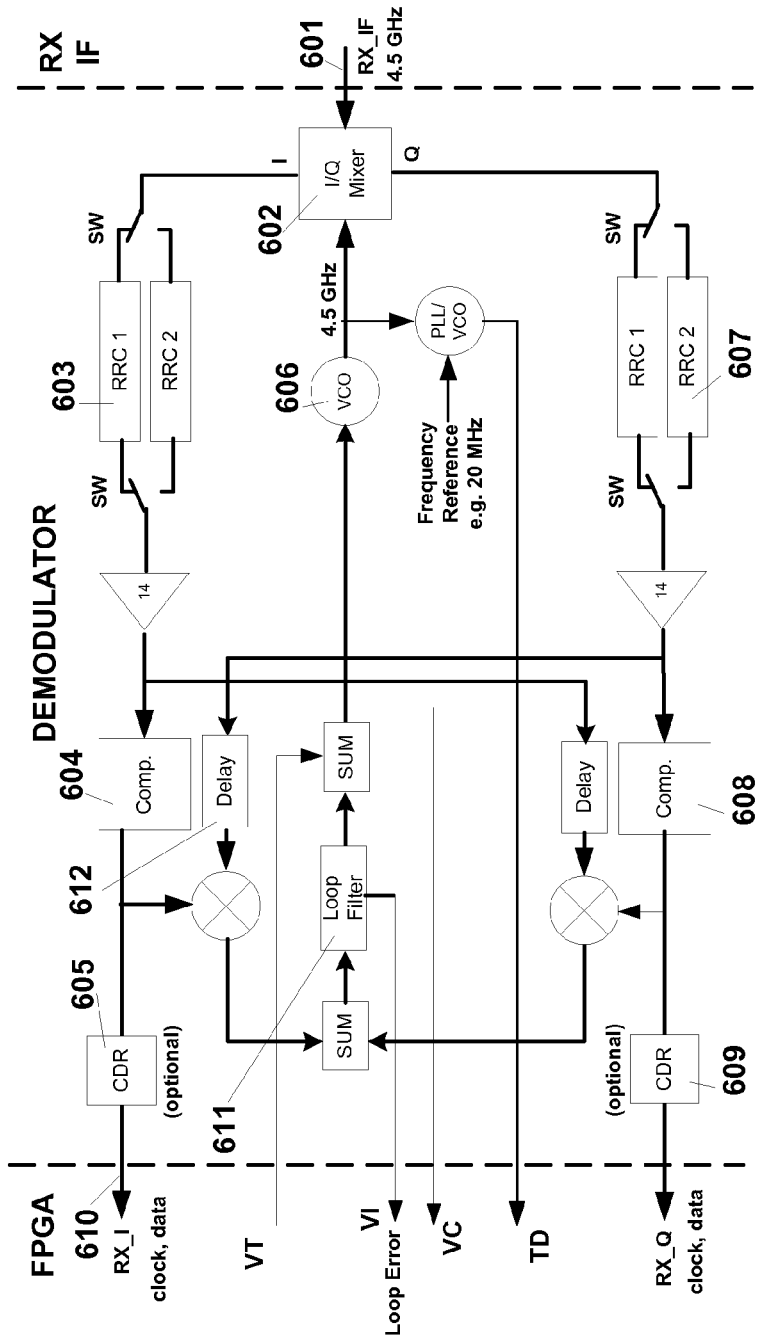
FIG. 6 is a block diagram of the demodulator of the radio terminal of FIG. 2.

FIGS. 6-11 depict various aspects of the demodulator 221, especially the carrier recovery operations. The QPSK demodulator block diagram is shown in FIG. 6. As shown, a received IF signal 601 (at 4.5 GHz for example) is down converted to a zero carrier frequency by an I/Q mixer 602 driven by a phase-locked VCO 606.

Each channel undergoes the same processing, but only the I-channel is described below. The I channel signal is filtered by a filter, which is switch-selected from a matched filter bank 603, approximating root-raised cosine frequency response and a bandwidth corresponding to the current adaptive symbol rate in use. The filtered signal is sliced by a comparator 604, and the clock and data are recovered using clock data recovery integrated circuit (CDR) 605, delivering received data to the digital processing unit 201, such as an FPGA, shown as element 610, which is the same digital processing unit 201 of FIG. 2. The CDR function is optional, since the SERDES in the digital processing unit 610 is capable of performing these functions, however an external CDR outperform the SERDES under harsh noise conditions thus it is a more desirable option. The VCO 606 must track the carrier frequency and phase, which is accomplished by a Costas Loop, including a loop filter 611 with additional frequency acquisition and control circuitry added as shown in FIG. 6, part of which is implemented inside the digital processing unit and further discussed below. As the carrier recovery circuit is implemented, some delay lines 612 might be required to compensate for delay differences of various signal processing paths and functions. While this delay 612 is shown in FIG. 6, such delay lines are ignored in following discussion and should be assumed present as necessary.

The QPSK demodulator 221 with the Costas loop might experience ambiguity whether the received (I,Q) pair of bit streams really corresponds to the transmitted (I,Q), or rather to (−Q, I), (−I,−Q) or (Q, −I). This well known problem is corrected inside the digital processing unit by observing the polarity of the FEC frame synch byte discussed above in conjunction with FIG. 3. The repeated frame byte 11000110 identifies the I-channel and the polarity of the control bits ahead of each word, which are mostly "01" by the above convention, indicate the real polarity of each I or Q channel. While in the rest of this disclosure the receive Q channel is assumed to contain only the original "+Q", the ambiguity is assumed to be corrected.

Figure 7:
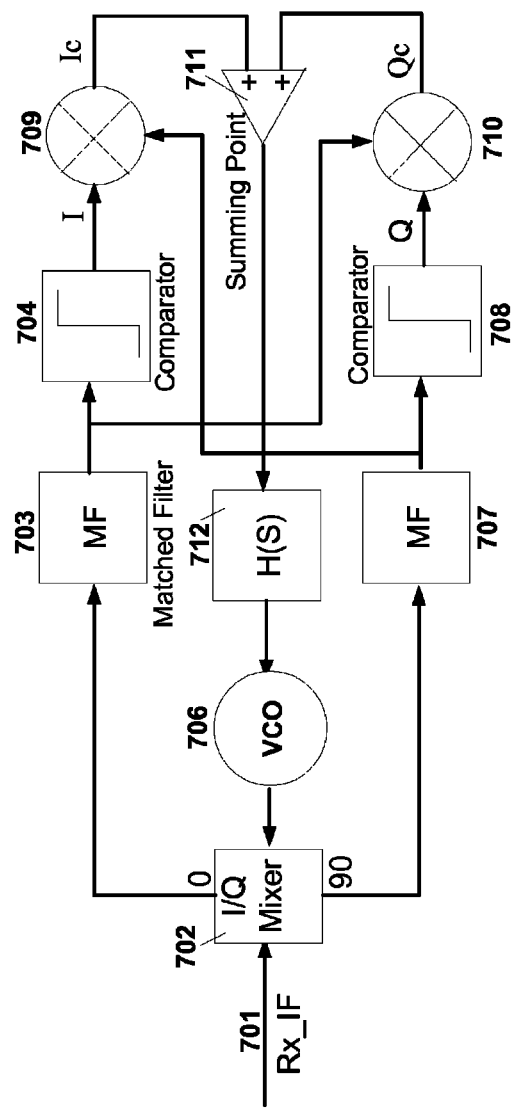
FIG. 7 is a block diagram of a Costas Loop function within the demodulator of FIG. 6.
Figure 9:
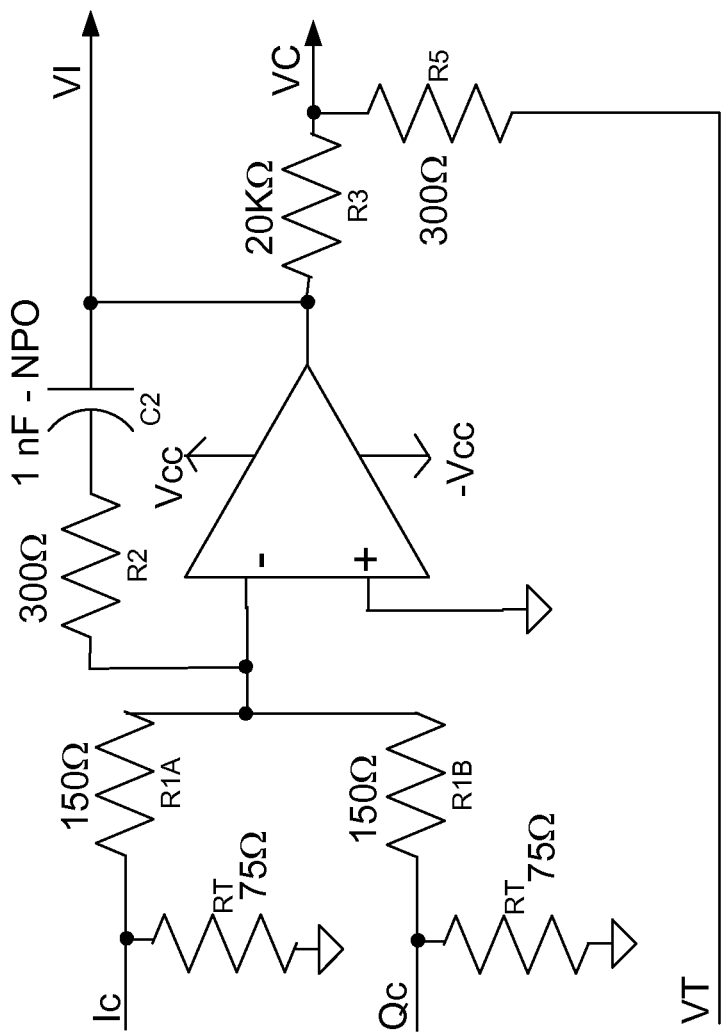
FIG. 9 is an example of the summing point and loop filter used in the Costas Loop of FIG. 7.

The Costas Loop is a known QPSK carrier recovery circuit, as depicted in FIG. 7. The existing demodulator components of FIG. 6 are used in this loop. This includes the VCO 707, I/Q mixer 702, matched filters 703/707 and comparators 704, 708. Therefore the only extra components added specifically for the Costas-Loop implementation are the extra mixers 709, 710, a summing point 711 and a loop filter 712. To allow good signal to noise ratio, the closed loop response is designed to have a noise-bandwidth of approximately 500 kHz, which at 100 MHz signal bandwidth and broadband-signal received SNR of 5 dB (slightly below the receive threshold), would provide 28 dB of loop SNR. Such loop SNR is required for lock stability and low noise jitter. The loop dynamic performance is set by designing the appropriate filter response 712 that in a closed loop (including the VCO 706) would provide a double pole at a frequency of about 500 KHz and a zero at 1 MHz. The design follows conventional rules of linear PLL system design and a detailed schematic of the summing point 711 and the loop filter 712 is shown in FIG. 9.

While this loop maintains lock at low channel SNR, obtaining lock or regaining lock after loss of synchronization is a major challenge, since the VCO must stay within 500 KHz of the received IF frequency of 4.5 GHz or else the VCO might not lock-in. Such commercially available VCO has a tuning sensitivity of about 118 MHz/V, thus an uncertainty of about 4.2 mV would shift the frequency outside of the lock-in range for a nominal tuning voltage of about 1.5V. If an 80 GHz radio frequency is known with accuracy of 0.5 ppm, the total uncertainty of the link is about 1 ppm, or 80 kHz. These conditions require accuracy of tuning voltage greater than the 4.2 mV, yet the VCO might drift over temperature, thus the tuning voltage cannot be preset. A stabilizing scheme for the VCO frequency accuracy and circuit locking is provided as shown in FIG. 8.

Figure 8:
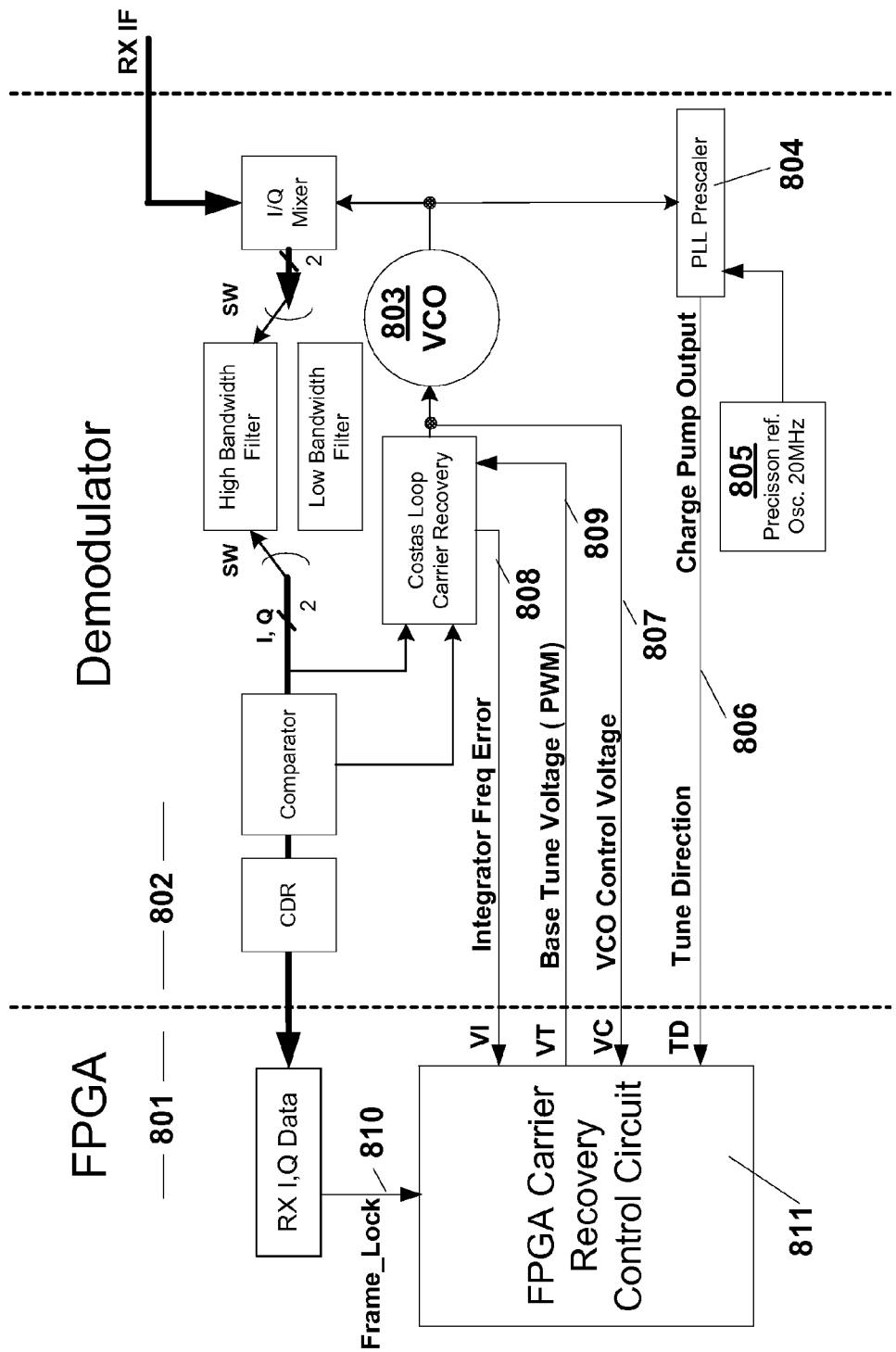
FIG. 8 shows the demodulator functions with a more detailed view of the carrier recovery functions and interfaces.

In particular, the demodulator block diagram is redrawn in FIG. 8 to emphasize the coordinated activities between the digital processing unit 201 (shown in FIG. 8 as FPGA 801) and the demodulator 221 (shown in FIG. 8 as demodulator 802.) The carrier recovery VCO 803 is monitored by a PLL integrated circuit (prescaler) 804 to compare the VCO 803 frequency with the PLL 804 frequency, which is set nominally at 4.5 GHz, based on a precision reference 805, such as the oscillator 215 in FIG. 2. The PLL 804 is intentionally left unable to phase lock to the VCO 803 by avoiding tuning feedback to the PLL 804. Therefore the PLL 804 charge pump creates a voltage whose sign is relative to the tuning direction required. With proper DC level shifting, this signal is called Tuning Direction "TD" 806 and it is input to the FPGA 801. For example, TD=1 indicates "Tune the VCO up" to obtain 4.5 GHz, and TD=0 means "tune down". The FPGA 801 also monitors the VCO 803 analog control voltage VC 807 with the use of an FPGA built-in A/D converter. The FPGA also monitors a loop integrator voltage VI 808, which under ideal lock conditions would be zero volts. The FPGA also monitors the FEC frame lock condition 810, which is generated in association with the Frame De-interleaver function 322 in FIG. 3. This signal 810 indicates a condition in which the VCO is most likely unlocked. The FPGA 801 performs a tuning algorithm to be described below, and outputs a "base tuning voltage" VT 809, which in combination with the integrator voltage VI provides the VCO control voltage VC. Since the FPGA can perform low-cost D/A conversion using a pulse-width modulation (PWM) scheme, the signal VT 809 is using PWM and a simple dual stage RC low-pass filter (not shown) to smooth out PWM ripple. The designed equation in the an embodiment for VC is:

$$VC=20/20.3VT+0.3/20.3VI \qquad \text{(Equation 1)}.$$

This equation constitutes a weighted summing of the signals VT and VI. This summing is implemented by the resistive network of R3 and R5 in FIG. 9. FIG. 9 is a circuit schematic of the summing point 711 and Loop Filter 712 from FIG. 7.

The FPGA 801 maintains an internal register that can be incremented or decremented. The increment step is desired to be below 1 mV, to allow tuning the VCO 803 in smaller steps then the lock-in frequency range, which was equivalent to 4.2 mV of tuning voltage step. At VT range of 0-2V, this 1 mV translates to 11 bits, which provide 2048 steps. Practically, a 12-bit resolution may be used.

Figure 10:
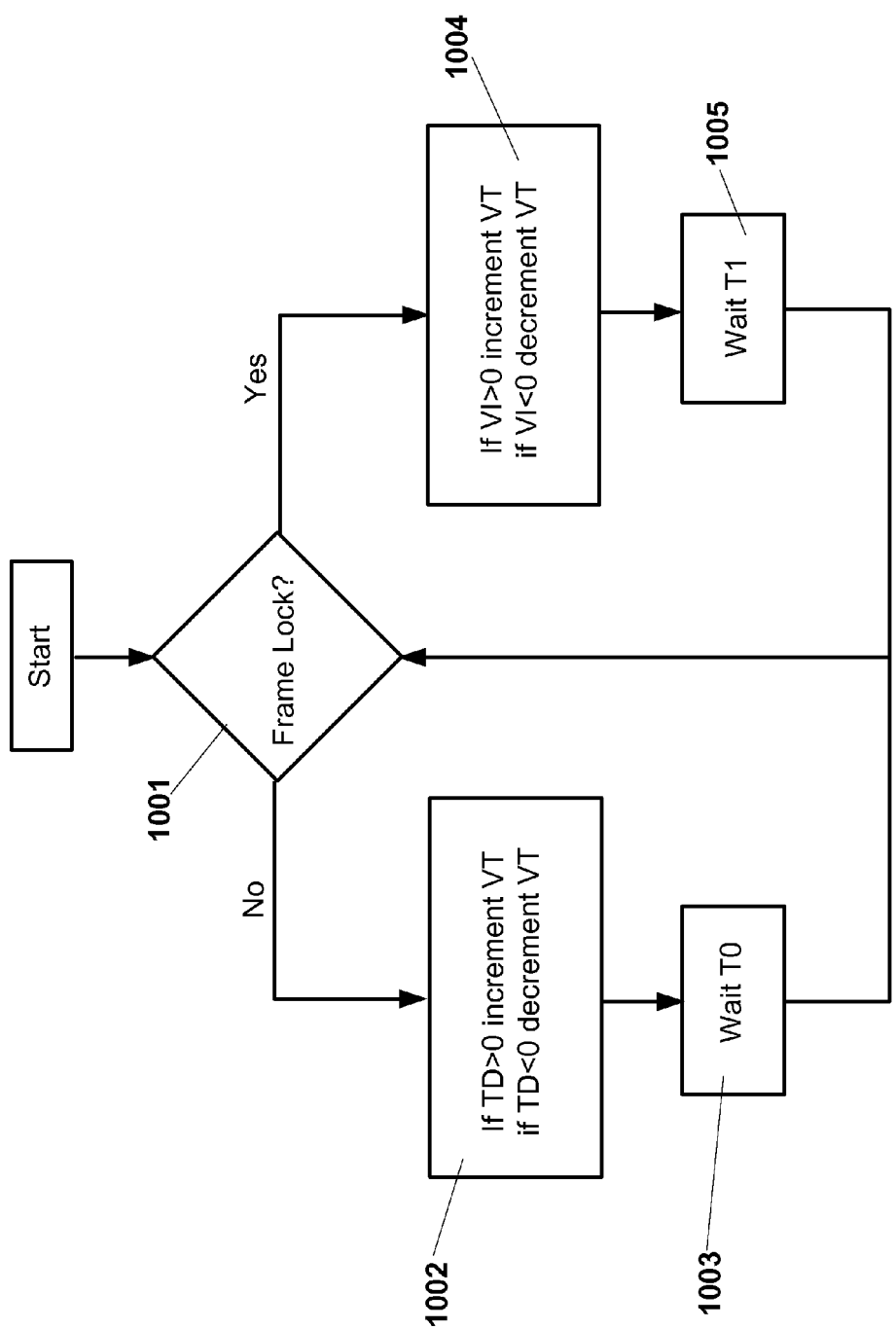
FIG. 10 is a flow chart of a first carrier recovery method that may be implemented by the radio terminal shown in FIG. 2.

A frequency acquisition method is described in FIG. 10. The digital processing unit monitors the FEC frame lock signal 810 in FIG. 8 (1001). If no lock has yet been obtained, the VCO is tuned up or down (VT is incremented or decremented) based on the TD signal (1002). Eventually the VCO reaches the desired frequency within one incremental step that keeps the VCO inside the tune-in range. After each incremental step the digital processing unit waits T0 seconds (e.g. 0.1 ms) (1003) to allow the new VT value to settle and frame lock to be achieved. Once a signal is received and frame lock is obtained, the integrator voltage VI becomes the fine-tuning direction indicator, allowing fine tuning the VCO (VT is incremented or decremented) based on the VI signal (1004) while the dynamic lock is maintained by the loop filter. A timer T1 (e.g. 0.1 ms) is used between successive approximations (1005).

Figure 11:
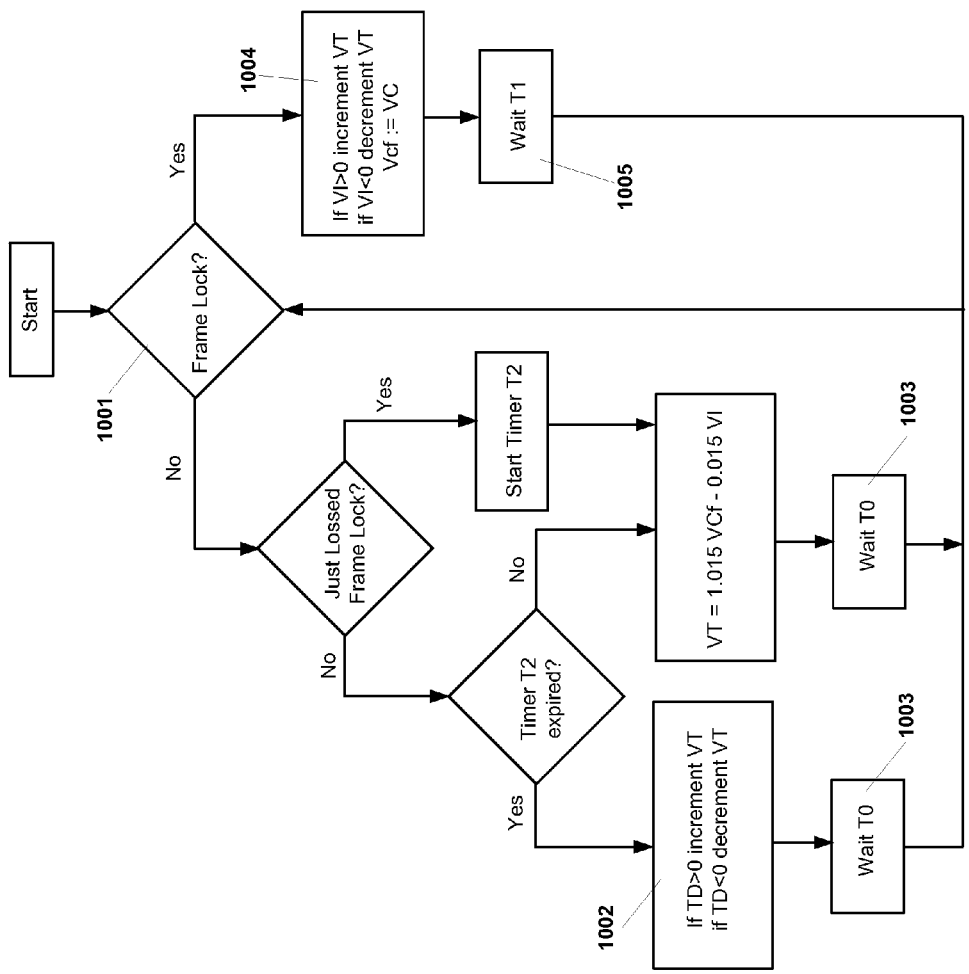
FIG. 11 is a flow chart of a second, more complex carrier recovery method that may be implemented by the radio terminal shown in FIG. 2.

A second frequency acquisition method is shown in FIG. 11. In this method, the digital processing unit makes use of the latest known good value of the VCO control voltage (VC) upon loss of lock. This last VC value is stored as a value "VCf". In loss of lock condition, the integrator voltage VI might rail to the operational amplifier's saturation voltage. Under these conditions, the best way to restore VCO voltage to the desired value VCf is to substitute VC in equation 1 above with VCf. This allows calculating the value of VT that will compensate for the wrong VI detuning voltage as:

$$VT=1.015VCf-0.015VI \qquad \text{(Equation 2)}.$$

Equation 2 is used for evaluating VT. This equation represents the performing of algebraic weighted summing of the stored variable VCf and the input variable VI. Upon loss of frame, a timer T2 is started. While T2 has not expired, VT is determined by Equation 2, running a new iteration every T0 seconds (e.g. 0.1 ms), since the value of VI might change. An example of value for T2 is 10 ms. Upon expiration of T2, or after regaining lock, the method resorts to a tuning rule identical to the first method of FIG. 10 (see processes 1001-1005 in FIG. 11 which correspond to the same processes as shown in FIG. 10) except that last VC value is stored as a value "VCf".

The digital processing unit functions including the monitoring of Frame Lock 810 and the external signals such as VI, TD and VC, and performing the carrier recovery algorithm are referred together as Carrier Recovery Control Circuit 811 as shown in FIG. 8. These functions are implemented using logic design high-language and might include state machines, storage registers and digital multiplications and other arithmetic operations as well known in the art of digital logic control and digital signal processing.

The two methods of FIGS. 10 and 11 complement each other and might even be used in the same system for different circumstances. The simpler method of FIG. 10 may be used when the system is subject to long outages such as rain fading, while the FIG. 11 method may be used if the system is subject to short outages caused by radio-frequency interference.

While the loop filter output VI 808 in FIG. 8 is described as an integrator output whose desired value under lock condition is zero, in more general, the signal VI indicates the loop filter output 611 in FIG. 6, which, depending on design, might have a non-zero desired value.

Figure 12:
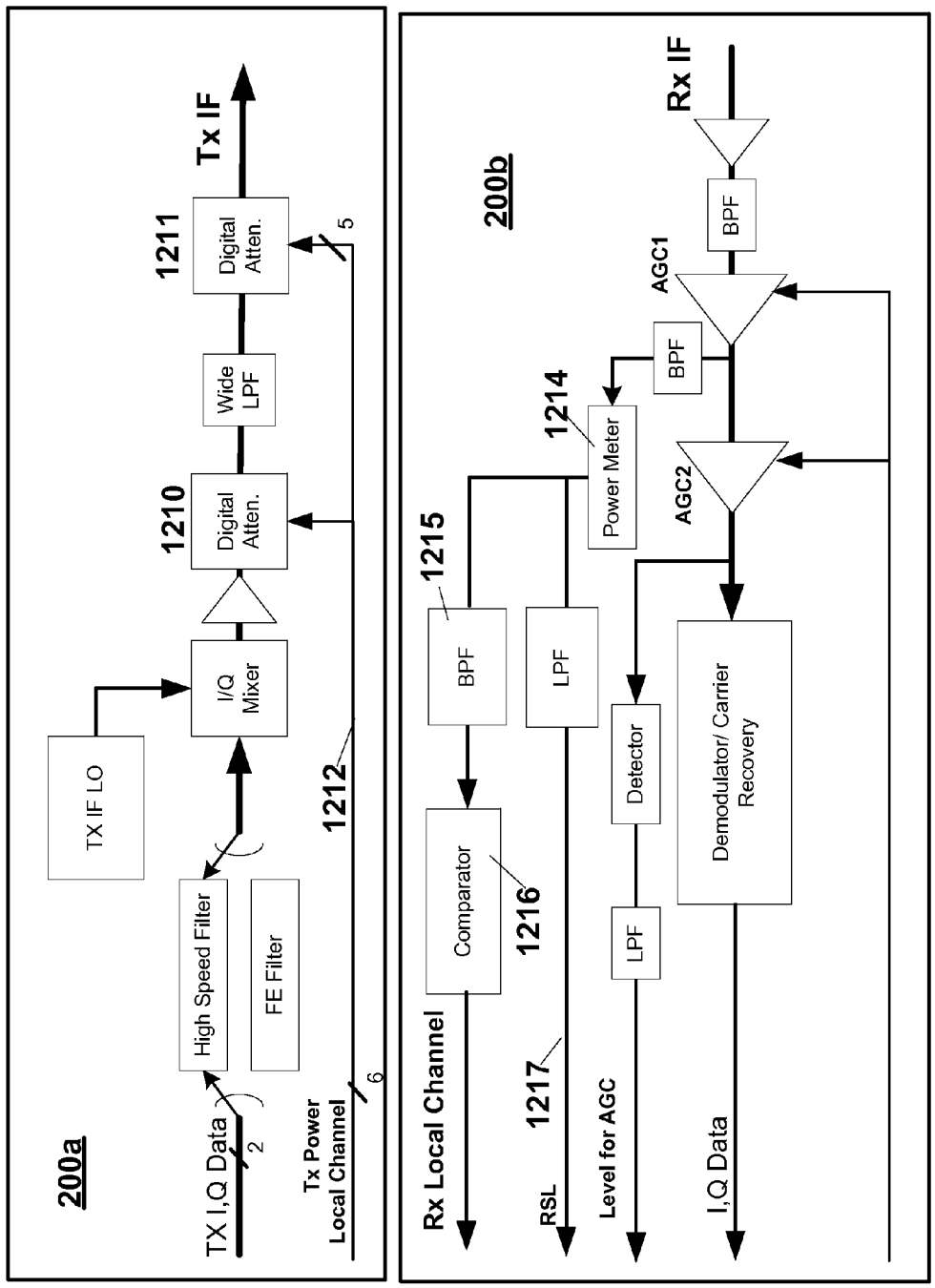
FIG. 12 is a block diagram of the modem/IF sections of the radio terminal of FIG. 2 with more details of a set of local channel related functions.

A local channel block diagram is depicted in FIG. 12. In the transmit side 200a, the transmit power is adjusted by digital attenuators 1210 and 1211. If a radio broadband link is not available, such as under deep rain fade or during antenna alignment process, the attenuators can be wiggled between the fully allowed transmit-power to the maximum attenuation, resulting in nearly 100% power modulation index. Such attenuation would make the broadband link un-usable, but the local channel wiggle can stop when proper received receive signal level (RSL) estimation occurs. This power meter will also indicate different voltage proportional to the local-channel modulated power. A simple band pass filter 1215 (with a high cut off frequency of less than 100 kHz) that acts as an approximate matched filter for the local channel bits, would allow bit recovery by a comparator 1216, which delivers the bits to the digital processing unit. Such modulation scheme is less efficient than conventional ON/OFF keying (OOK), the main difference being the detection of power rather than detection of amplitude used in radio OOK, however the simplicity of this scheme that relies mostly on components already present in the radio terminal, and the ability to operate without carrier synchronization, makes this scheme useful for very high speed links. For example, a 1 GHz link with a 10 Kbps local channel will operate with bit error ratio below 10E-6 at the broadband channel SNR of −12 dB, well below the 1 GHz-bandwidth QPSK threshold of nearly +10 dB.

Upon return to normal signal levels, the local channel wiggle either stops completely, to allow normal reception of the broadband signal, or the attenuators 1210/1211 might be modulated by small steps, e.g. 1 dB, if local channel communications is still desired.

While the foregoing has been with reference to a particular embodiment of the disclosure, it will be appreciated by those skilled in the art that changes in this embodiment may be made without departing from the principles and spirit of the disclosure, the scope of which is defined by the appended claims.

The invention claimed is:

1. A rate-adaptive digital microwave radio terminal at frequencies above 30 GHz and at least one operating mode with aggregate bit rate exceeding 1 gigabits per second, the radio terminal comprising:
   a quadrature modulator having an I-port to receive an I-channel and a Q-port to receive a Q-channel wherein the quadrature modulator generates a modulated signal;
   a digital processing unit with at least two SERDES ports including a first SERDES port transmitting a serial bit stream directed to the I-port of the quadrature modulator and a second SERDES port transmitting a serial bit stream directed to the Q port of said quadrature modulator;
   and the digital processing unit switches bit rates based on a link condition.

2. The terminal of claim 1, wherein the first SERDES port serial bit stream passes through a filter before it is input to the I-port of the quadrature modulator and wherein the second SERDES port serial bit stream passes through a filter before it is input to the Q-port of the quadrature modulator.

3. The terminal of claim 2, wherein each filter further comprises a switched bank of one or more filters with each filter of the switched bank of filters corresponding to a different symbol rate.

4. The terminal of claim 1 further comprising a data segregating unit and a data mapping unit having at least two priorities and wherein one of the I-port and Q-port contains lower priority data segregated and mapped onto a low-priority port.

5. The terminal of claim 4, wherein said low priority port is disabled during a link fade event.

6. The terminal of claim 5, wherein each port outputs binary phase shift keying (BPSK) symbols and the combined traffic of the ports are output as quaternary phase shift keying (QPSK) symbols.

7. The terminal of claim 5, wherein the disabled low priority port degrades the modulator from QPSK modulation to BPSK modulation.

8. The terminal of claim 4, wherein the data segregating unit further comprises an Ethernet Switch.

9. The terminal of claim 4, wherein the data mapping unit further comprises a digital multiplexer.

10. The terminal of claim 9, wherein the digital multiplexer further comprises a payload framer.

11. The terminal of claim 10, wherein the payload framer maps at least some of the data of lower priority to distinct positions within said payload frame.

12. The terminal of claim 11, wherein the distinct positions of said payload frame are mapped to one specific subset of the SERDES ports.

13. The terminal of claim 1, wherein the digital processing unit is a field programmable gate array.

* * * * *